US008654946B1

(12) United States Patent
Patro et al.

(10) Patent No.: US 8,654,946 B1
(45) Date of Patent: Feb. 18, 2014

(54) SYSTEM, METHOD, AND COMPUTER PROGRAM FOR SENDING A MISSED CALL NOTIFICATION TO A RECEIVER BASED ON AN INSTRUCTION FROM A CALLER

(75) Inventors: Debabrata Patro, Pune (IN); Gerald W. Mickelson, Pune (IN)

(73) Assignee: Amdocs Software Systems Limited, Dublin (IE)

( * ) Notice: Subject to any disclaimer, the term of this patent is extended or adjusted under 35 U.S.C. 154(b) by 765 days.

(21) Appl. No.: 12/769,573

(22) Filed: Apr. 28, 2010

(51) Int. Cl.
*H04M 3/42* (2006.01)
*H04W 4/14* (2009.01)

(52) U.S. Cl.
USPC .............. 379/201.01; 379/209.01; 455/414.1; 455/466

(58) Field of Classification Search
USPC ........ 379/201.01, 207.15, 209.01; 455/414.1, 455/415, 466, 566
See application file for complete search history.

(56) References Cited

U.S. PATENT DOCUMENTS

| 7,580,514 B2 | 8/2009 | Pelletier et al. .......... 379/201.01 |
| 2002/0078143 A1* | 6/2002 | De Boor et al. ............... 709/203 |
| 2007/0091869 A1* | 4/2007 | Kahn ............................. 370/352 |
| 2009/0203361 A1* | 8/2009 | Huang et al. ............... 455/414.1 |
| 2010/0004006 A1* | 1/2010 | Guo et al. ..................... 455/466 |

OTHER PUBLICATIONS

"Missed Calls—The New Way of Life," News Flash, Cellular Operators Association of India, Jun. 10, 2005.
Donner, J., "The Rules of Beeping: Exchanging Messages Via Intentional 'Missed Calls' on Mobile Phones," Journal of Computer-Mediated Communication, 13(1), article 1, Oct. 2007.
"Call Me Back," Zain, Phone Services, http://www.ng.zain.com/PhoneServices/CallMeBack/tabid/1.52/Default.aspx, May 21, 2009.

* cited by examiner

*Primary Examiner* — Harry Hong
(74) *Attorney, Agent, or Firm* — Zilka-Kotab, PC (57) ABSTRACT

A system, method, and computer program product are provided for sending a missed call notification to a receiver based on an instruction from a caller. In use, an instruction is received from a caller to send a missed call notification to a receiver. Additionally, at least one parameter associated with the instruction is identified. Further, the missed call notification is generated utilizing the at least one parameter. Moreover, the missed call notification is sent to the receiver.

26 Claims, 6 Drawing Sheets

SYSTEM, METHOD, AND COMPUTER PROGRAM FOR SENDING A MISSED CALL NOTIFICATION TO A RECEIVER BASED ON AN INSTRUCTION FROM A CALLER

FIELD OF THE INVENTION

The present invention relates to missed calls, and more particularly to missed call notifications.

BACKGROUND

To date, a significant number of telephone users have begun placing calls for the purpose of being missed by the receivers of such calls. For example, a telephone user may place call, allow the call to ring a desired number of times, and then disconnect the call prior to the receiver of the call answering the call. This practice ultimately results in a notification of a missed call being provided to the receiver. Unfortunately, the effect of the purposeful placement of these missed calls has been largely undesirable.

Just by way of example, missed calls generally cause non-revenue generating traffic for the network service providers whose service is utilized to provide the missed calls. At the same time, such missed calls consume network resources, information technology (IT)/billing system capacity, etc. There is thus a need for addressing these and/or other issues associated with the prior art.

SUMMARY

A system, method, and computer program product are provided for sending a missed call notification to a receiver based on an instruction from a caller. In use, an instruction is received from a caller to send a missed call notification to a receiver. Additionally, at least one parameter associated with the instruction is identified. Further, the missed call notification is generated utilizing the at least one parameter. Moreover, the missed call notification is sent to the receiver.

DETAILED DESCRIPTION

Figure 1:
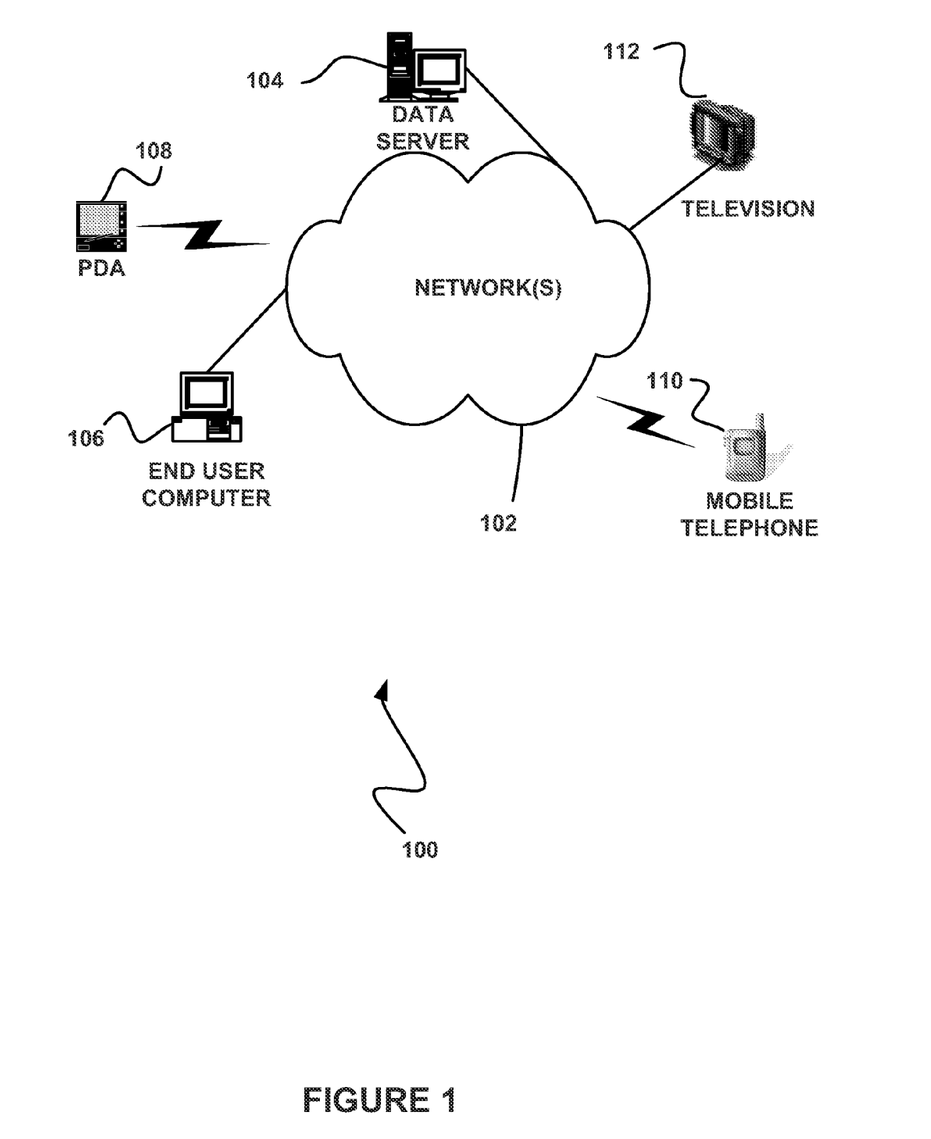
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
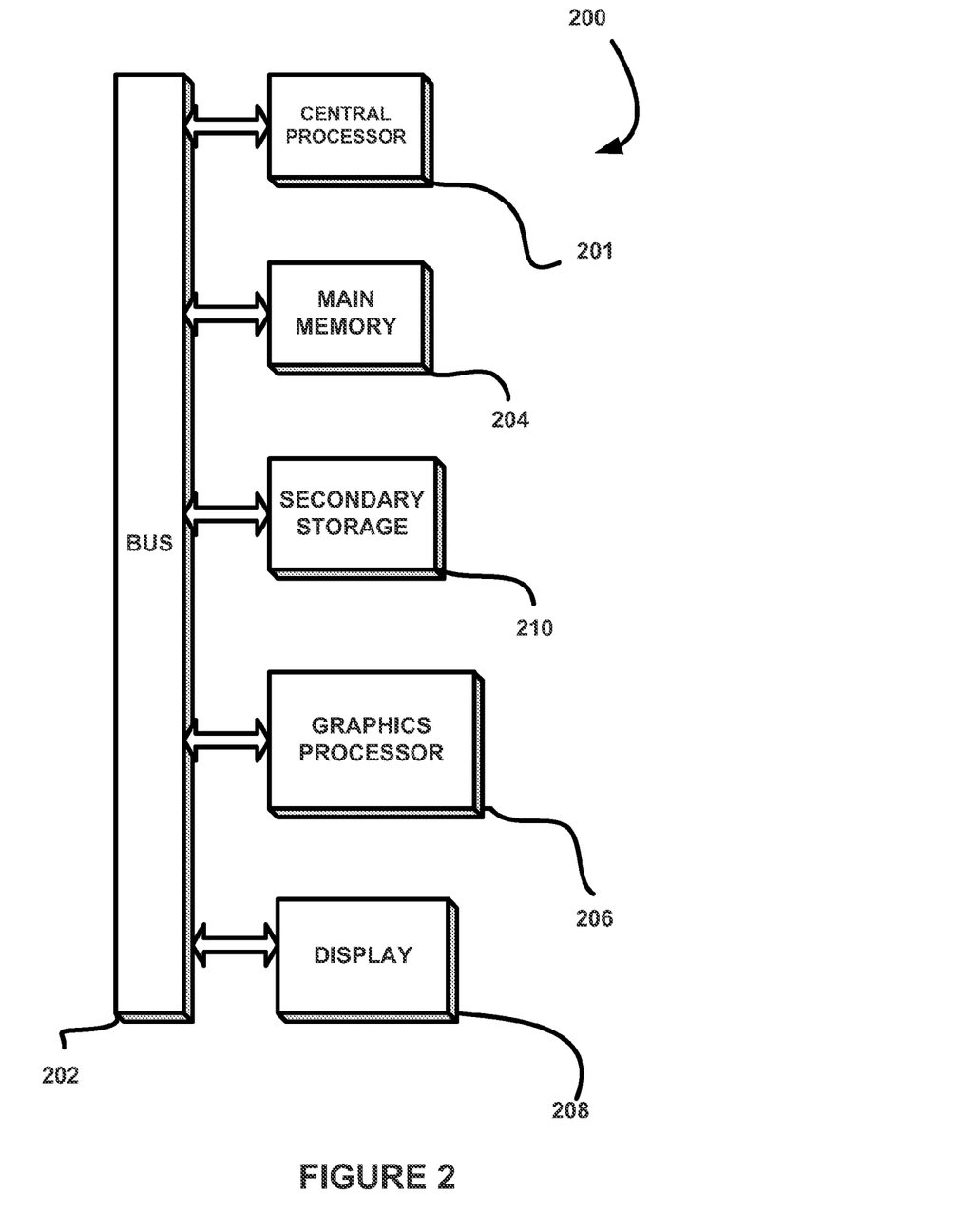
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
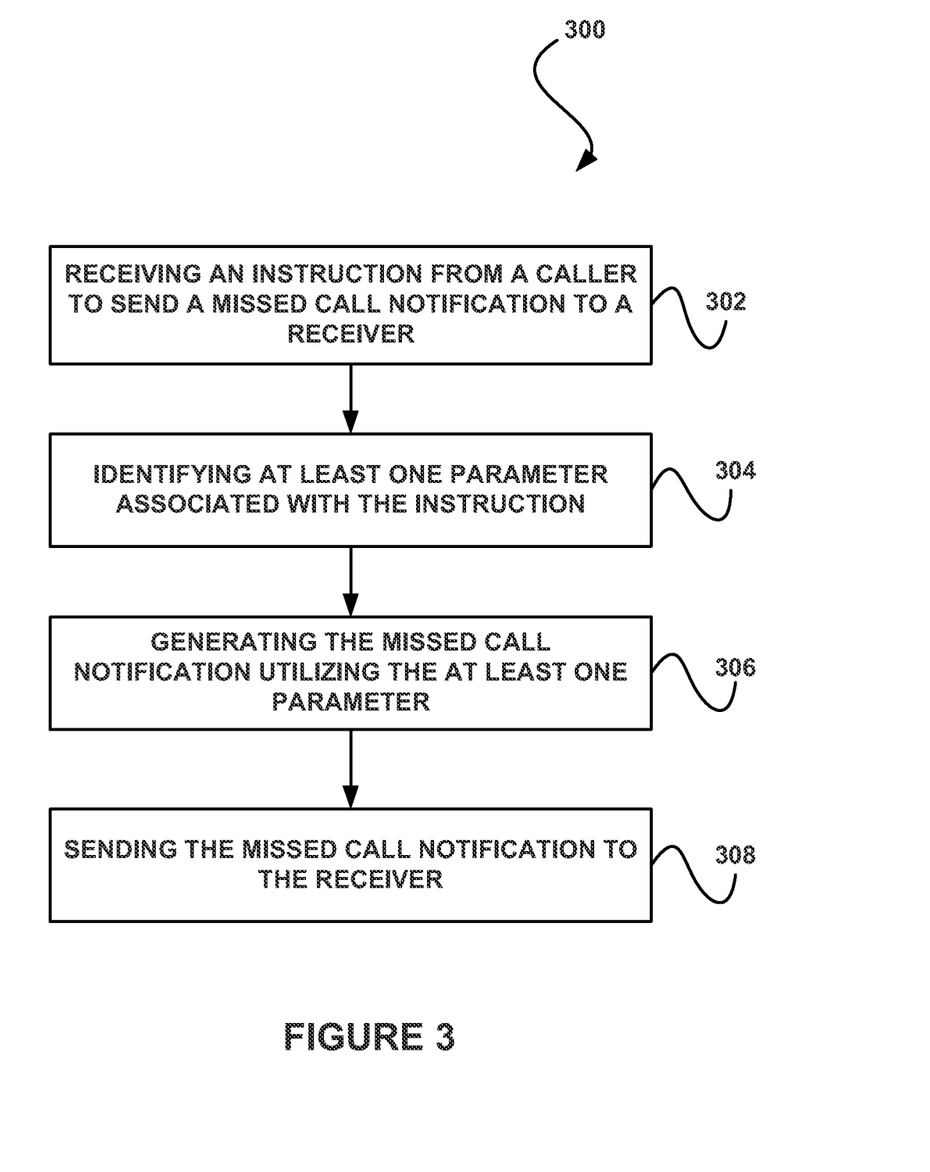
FIG. 3 illustrates a method for sending a missed call notification to a receiver based on an instruction from a caller, in accordance with one embodiment.

FIG. 3 illustrates a method 300 for sending a missed call notification to a receiver based on an instruction from a caller, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, an instruction is received from a caller to send a missed call notification to a receiver. The caller may include any user instructing a missed call notification to be sent to the receiver. Thus, the caller may include a user of a calling device capable of being utilized for instructing the missed call notification to be sent to the receiver.

Further, the receiver may include any user to which the missed call notification is sent. For example, the receiver may include a user of a receiving device capable of being utilized to receive the missed call notification. It should be noted that such calling device and receiving device may include any of the devices described above with respect to FIGS. 1 and/or 2 by which the instruction to send the missed call notification may be received and the missed call notification sent, respectively. For example, the calling device and/or receiving device may include a mobile phone, a PDA, a landline phone, etc.

The form and content of missed call notifications may vary depending on a number of factors including the particulars of the network and/or devices in which systems and methods consistent with the present invention may be implemented. In one embodiment, the missed call notification may include an additional notification that the caller may want to notify to the receiver. For example, the missed call notification may simulate a notification of an actual call missed by the receiver, and may optionally indicate a number of rings and that the call attempt was abandoned, as described below. In this way, the missed call notification may be used by the caller as a substitute for the caller placing a call to the receiver and purposely terminating the call prior to the receiver answering the call. In various embodiments, the missed call notification (e.g. message) may be in a visual format (e.g. text, image, etc.). In other implementations the missed call notification may be audible. And in still other implementations the missed call notification may be a combination of visual and audible formats.

To this end, the instruction from the caller to send a missed call notification to a receiver may include any command, code, etc. utilized to request that a missed call notification be sent to the receiver or otherwise utilized to initiate the sending of the missed call notification to the receiver. In various embodiments, the instruction may be received as a short message service (SMS) message, an unstructured supplementary service data (USSD) message, etc. In one embodiment, the instruction may be received by way of a calling device of the caller sending the instruction to a predefined number separate from a receiving device utilized by the receiver for receiving the missed call notification. For example, the instruction may be received using a predefined number of a call and/or message routing device of a network service provider providing, at least in part, communications between the calling device and the receiving device.

In another embodiment, the instruction may be received in response to the caller selecting a predefined option on the calling device of the caller. Optionally, a menu of a graphical user interface (GUI) of the calling device may provide an option to instruct a missed call notification to be sent to a particular receiver. As another option, an existing menu of a GUI of the calling device including options to call a receiver, send a SMS message to a receiver, etc. may be modified to include the option to instruct a missed call notification to be sent to a particular receiver. Such modification may be performed using a subscriber identity module (SIM) toolkit application that creates the option or functionality built into the calling device. In another embodiment, the option of initiating the missed call notification may be performed by a mobile application that provides the option or functionality on the calling device.

By providing the aforementioned option to instruct that a missed call notification be sent to a receiver, the caller may avoid having to remember and enter the predefined number to which the instruction is to be sent, a particular code for indicating that the instruction is for a missed call notification, etc. For example, the caller may avoid having to remember and enter an SMS number, USSD keys, or any other data required to instruct that a missed call notification be sent to a particular receiver, such that the probability that the caller will manually dial the number of the receiver and manually disconnect in order to create the missed call notification may be reduced.

Additionally, at least one parameter associated with the instruction is identified, as shown in operation 304. With respect to the present description, the parameter may include any information (e.g. characteristic, description, etc.) associated with the instruction. Furthermore, the parameter(s) may be identified based on a predefined policy indicating which parameters of instructions to send missed call notifications are to be identified.

In one embodiment, the parameter may include a number of a receiving device utilized by the receiver for receiving the missed call notification. For example, the parameter may include a number (e.g. telephone number) to which the missed call notification is instructed to be sent (e.g. as indicated by the caller). Of course, as another option, the parameter may include any identifier of the receiving device to which the missed call notification is instructed to be sent.

In another embodiment, the parameter may include a number of a calling device of the caller utilized for sending the instruction. For example, the parameter may include a number (e.g. telephone number) from which the instruction to send the missed call notification was sent. Again, as another option, the parameter may include any identifier of the calling device from which the instruction to send the missed call notification is sent.

In yet another embodiment, the parameter may include a number of rings associated with the missed call notification. Such number of rings may indicate a particular message that is to be included in the missed call notification. For a different message may be predefined for each of a plurality of different numbers of rings. Thus, the number of rings may be configurable by the caller for indicating the one of the predefined messages to be included in the missed call notification.

It should be noted that the number of rings may be indicated using the instruction in any desired manner. As an option, a second level menu of the GUI providing the missed call notification option described above may allow the caller to select the number of rings associated with the missed call message. The number of rings may accordingly allow the caller to specify the number of rings that the caller wants to simulate. In this way, a missed call notification may be instructed for a particular number of rings, without necessarily calling the receiving party and allowing the particular number of rings to occur (e.g. where the receiving party may have otherwise answered the call before the caller is able to disconnect or where ringtones, or where ring back tones may otherwise remove the ability of the caller or receiver to count the number of rings).

In one embodiment, the parameter associated with the instruction may be identified by extracting the at least one parameter from the instruction. For example, upon the caller instructing that the missed call notification be sent to the receiver, the number of the calling device, the number of the receiving device, the number of rings set by the caller, etc. may be automatically included in the instruction. As another example, the device receiving the instruction (e.g. the call and/or message routing device of the network service provider) may identify the calling device using a protocol via which the instruction is received.

Further, the missed call notification is generated utilizing the at least one parameter. Note operation 306. As noted above, the missed call notification may include an audible notification, a visual notification, etc. For example, the missed call notification may include an SMS message, a USSD message, a flash USSD message, etc. (e.g. where the type of the missed call notification is selected based on the network service provider receiving the instruction to send the missed call notification). Thus, the missed call notification may be generated utilizing the parameter(s) by creating a notification of the missed call that is capable of being sent to the receiver, using the parameter(s).

In one embodiment, the missed call notification may be generated by configuring text included in the missed call notification based on the parameter(s). Just by way of example, where the parameter includes the number of the calling device, the text included in the missed call notification may be of the number of the calling device. As another example, where the parameter includes the number of rings associated with the missed call notification, the text included in the missed call notification may be of a predetermined message associated with the number of rings. Table 1 illustrates various examples of missed call notifications that may be generated based on parameters identified from an instruction to send a missed call notification. It should be noted that such missed call notifications shown in Table 1 are set forth for illustrative purposes only, and thus should not be construed as limiting in a any manner.

TABLE 1

1) "Please call me back - Phone 123456789"
2) "987654321 miss called you with 3 rings"

As an option, the missed call notification may be further generated by incorporating additional information into the missed call notification, which may or may not be based on the parameter(s). For example, the missed call notification may be generated by incorporating promotional content (e.g. an advertisement, coupon, etc.) into the missed call notification, or otherwise appending the same to the missed call notification.

As an option, the promotional content may be selected based on the parameter(s). For example, where the receiver of the instruction to send the missed call notification is capable of accessing a profile of the caller and/or receiver based on the number of the calling device and/or number of the receiving device, respectively, such profile(s) may be utilized for selecting promotional content targeted to the caller and/or receiver based on the profile(s). In the embodiment noted above where the receiver is the network service provider, the profiles may be accessible for a caller and/or receiver that is a subscriber to the network service provided by the network service provider. The profile may include any information about the caller and/or receiver that the network service provider may have in their repository and may include historical information about the caller and/or receiver's use of missed call related functionality. Table 2 illustrates examples of promotional content that may be selected based on the parameter(s). Again, it should be noted that such promotional content is set forth for illustrative purposes only and should not be construed as limiting in a any manner.

TABLE 2

1) Transfer money from receiver to caller
2) Send gift from receiver to caller

As another option, the missed call notification (e.g. USSD notification) may be generated to be interactive. For example, the missed call notification may be generated to include an option for allowing the receiver to initiate a call to the caller utilizing the missed call notification. The option may further indicate that a discount for the call will be provided. Table 3 illustrates-one example of a discount that may be indicated by a missed call notification. Such exemplary discount is set forth for illustrative purposes only and should not be construed as limiting in a any manner.

TABLE 3

1) "987654321 miss called you, call her back now and get a 10% discount for a call of more than 2 minute?"

Moreover, as shown in operation 308, the missed call notification is sent to the receiver. It should be noted that the missed call notification may be sent to the receiver in any manner that allows the receiver to receive the missed call notification. For example, the missed call notification may be sent to the receiving device (e.g. as indicated by the number of the receiving device identified in association with the instruction).

In this way, the receiver may receive may receive the missed call notification in response to the caller instructing that such a missed call notification be sent, such that a call to the receiver by the caller and a subsequent disconnect of the call by the caller to generate such a missed call notification may be avoided. Furthermore, by the caller sending the instructions to send the missed call as an SMS message, USSD message, etc., instead of calling the caller and disconnecting to generate the missed call, network traffic (and thus the consumption of network capacity) may be reduced. In addition, since the SMS and USSD services are universal and are far less costly then voice service, utilizing SMS message, USSD message, etc. to instruct the sending of the missed call notification may give a more cost effective and scalable model than utilizing voice services (e.g. the caller calling the receiver and disconnecting) to generate the missed call notification.

As another option, the aforementioned predefined number (e.g. of the call and/or message routing device of the network service provider) may be utilized as a bypass number that may not necessarily result in charges to the caller. To this end, the predefined number may be utilized to reduce consumption of information technology (IT)/billing system capacity (e.g. processing resources) and storage space [e.g. by preventing processing associated with a call detail record (CDR), call setup, authorization, and/or balance reservation and release cycle for prepaid accounts, etc. otherwise performed for a call utilized for generating the missed call notification].

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
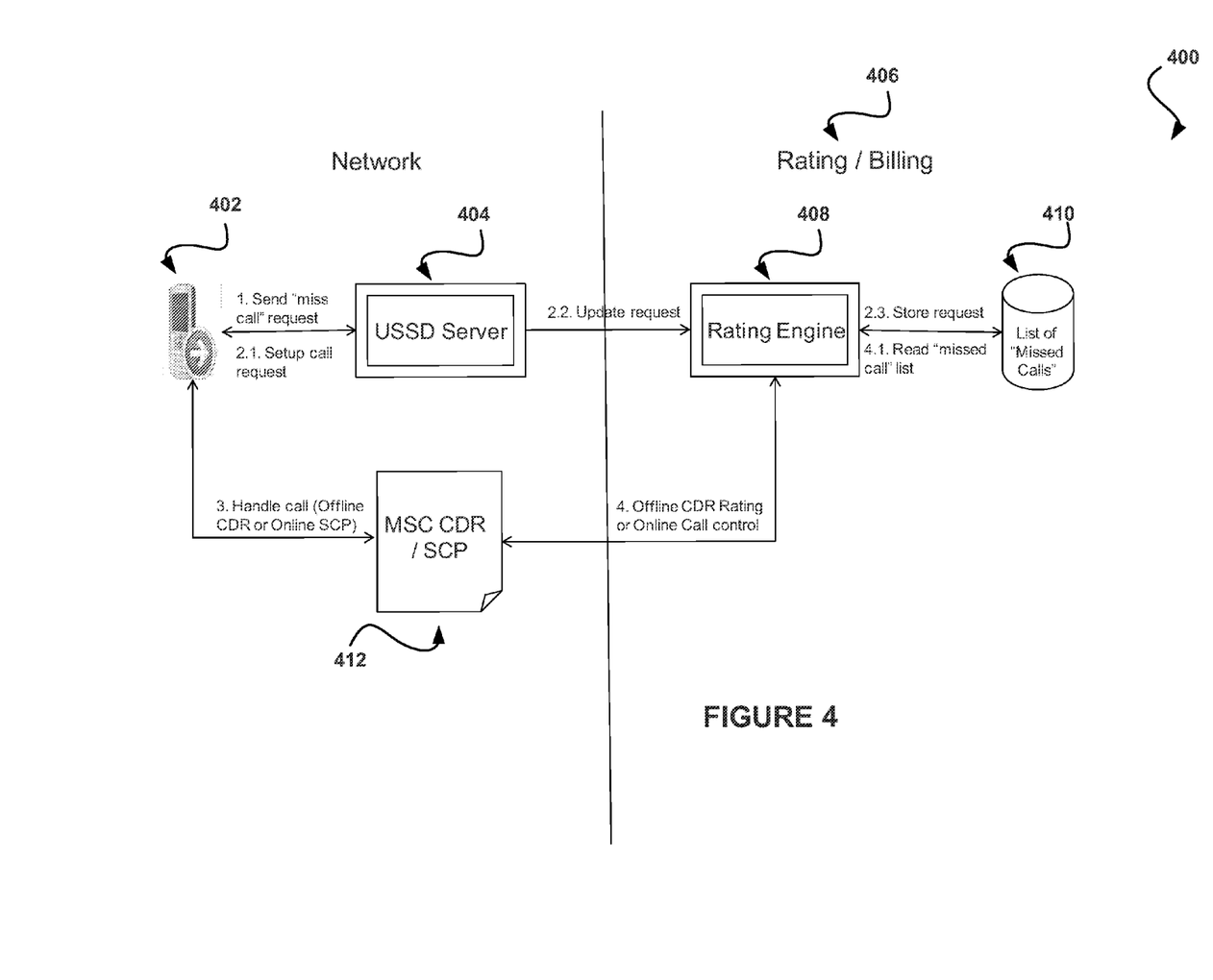
FIG. 4 illustrates a system for sending a missed call notification to a receiver based on an instruction from a caller and identifying a call from the receiver that is responsive to the missed call notification, in accordance with another embodiment.

FIG. 4 illustrates a system 400 for sending a missed call notification to a receiver based on an instruction from a caller and identifying a call from the receiver that is responsive to the missed call notification, in accordance with another embodiment. As an option, the system 400 may be implemented in the context of the details of FIGS. 1-3. Of course, however, the system 400 may be implemented in any desired environment. Again, the aforementioned definitions may equally apply to the description below.

As shown, a calling device 402 sends a request for a missed call notification to be sent to a receiver. The request is received by a USSD server 404. Thus, the calling device 402 and the USSD server 404 may be in communication via a network, for example. In one embodiment, the USSD server 404 may include a device of a network service provider to which the calling device 402 has a subscription. Of course, however, the USSD server 404 may include any device for receiving the request for the missed call notification. It should be noted that while a USSD server 404 is shown, the request for the missed call notification may be received by any server (e.g. SMS server, etc.) capable of being used to generate and send the missed call notification based on the request.

Upon receipt of the missed call notification, the USSD server 404 identifies at least one parameter associated with the request. For example, the USSD server 404 may identify a number of the calling device 402, a number of a receiving device of the receiver to which the missed call notification has been requested to be sent, a number of rings to be indicated by the missed call notification, etc. Optionally, the parameters identified in association with the request may be based on a policy of the USSD server 404 (e.g. stored by the USSD server 404). The missed call notification is then generated by the USSD server 404 utilizing the parameter(s), and is sent to the receiving device (not shown).

In the present embodiment, one of the parameters associated with the request that is identified by the USSD server 404 may include a timestamp associated with the request. For example, the parameter may include a time at which the request was received by the USSD server 404. An update request is sent to a rating engine 408 of a rating/billing system 406 from the USSD server 404 to store the request details and utilize the same to rate and bill for communications from user devices, such as the calling device 402.

In the present embodiment, the update request may include a request for the rating engine 408 to update a list of missed calls 410 (e.g. stored in a repository accessible by the rating engine 408) with the request for the missed call notification received from the calling device 402. Further, the timestamp or any other parameter identified by the USSD server 404 may be included in the update request sent from the USSD server 404 to the rating engine 408, such that the rating engine 408 may update the list of missed calls 410 to include an indication of the instruction received from the calling device 402 by the USSD server 404 and the timestamp (or other parameter) associated therewith. In this way, an indication of the missed call notification that was sent from the USSD server 404 to the receiver, as requested by the calling device 402, may be stored for subsequent use thereof, as described below.

Optionally, the caller may be provided an incentive (e.g. by the network service provider) for sending a missed call notification to a receiver that is on a network separate from the network to which the caller subscribes. Such an incentive may include a discount, coupon, etc. for sending such missed call notifications to receivers on other networks. This incentive may optionally be utilized for increasing network traffic sent to the network of the network service provider (e.g. and may include providing the caller with a share of the interconnect revenue generated by the network service provider from the receiver calling the caller in response to the missed call notification).

In response to a call from the receiver (e.g. via the receiving device of the receiver) to the calling device 402, the call is processed by a mobile switching center (MSC) CDR/service control point (SCP) 412, for example, of the network service provider. In one embodiment, the call may be processed using an offline call detail record (e.g. if the receiver has a post-paid account with the network service provider). In another embodiment, the call may be processed using an online SCP (e.g. if the receiver has a pre-paid account with the network service provider).

A rating request is sent from the MSC CDR/SCP 412 to the rating engine 408, based on the processing of the call. The rating request may include parameters associated with the call, such as the number of the receiver that initiated the call, the number of the caller that received the call, a timestamp associated with the call (e.g. indicating a time the call was initiated by the receiver), etc. Upon receipt of the rating request, the rating engine 408 rates the call for use in billing the receiver and/or caller.

As shown, the rating engine 408 may read the list of missed calls 410 for determining whether the call is responsive to a missed call notification sent from the calling device 402 to the receiver (such as the missed call notification described above). In one embodiment where the call is initiated separate from a missed call notification, parameters associated with the call that are included in the rating request may be compared to parameters of missed call notifications listed by the list of missed calls 410. If predetermines ones of the parameters (e.g. the number of the receiver, the number of the calling device 402, etc.) match between the call and one of the missed call notifications included in the list 410, and optionally if the timestamp associated with the call indicates a time within a predetermined period of time associated with the timestamp of the one of the missed call notifications, it may be automatically determined that the call is responsive to a missed call notification sent from the calling device 402 to the receiver.

Of course, in another embodiment where the call is initiated using an interaction with the missed call notification (e.g. by selecting an option, etc.), the MSC CDR/SCP 412 may automatically determine that the call is responsive a missed call notification sent from the calling device 402 to the receiver, and may indicate the same to the rating engine 408 (e.g. in real-time or offline). The call may then be rated based on whether it is determined that the call is responsive a missed call notification sent from the calling device 402 to the receiver, and further billed to the receiver based on the rating.

For example, the call may be rated based on a first policy associated with calls responsive to missed call notifications or a second policy associated with calls initiated separately from (i.e. non-responsive to) any missed call notification, based on the determination. Such policies may be defined by the USSD server 404, and provided to the rating engine 408 for use thereof. In another embodiment, such policies may be defined in the Rating Engine 408. As an option, the policy associated with calls responsive to missed call notifications may indicate an additional message, discount or surcharge, minimum call duration, and/or any other parameters associated with rating a call responsive to a missed call notification. Just by way of example, the missed call notification sent to the receiver may indicate that a call made to the caller in response to the missed call notification within a first predetermined period of time from receipt of the missed call notification that lasts for a second predetermined period of time will be charged at a discounted rate. To this end, calls determined to be responsive to missed call notifications may be rated differently than calls determined to not be responsive to missed call notifications.

Figure 5:
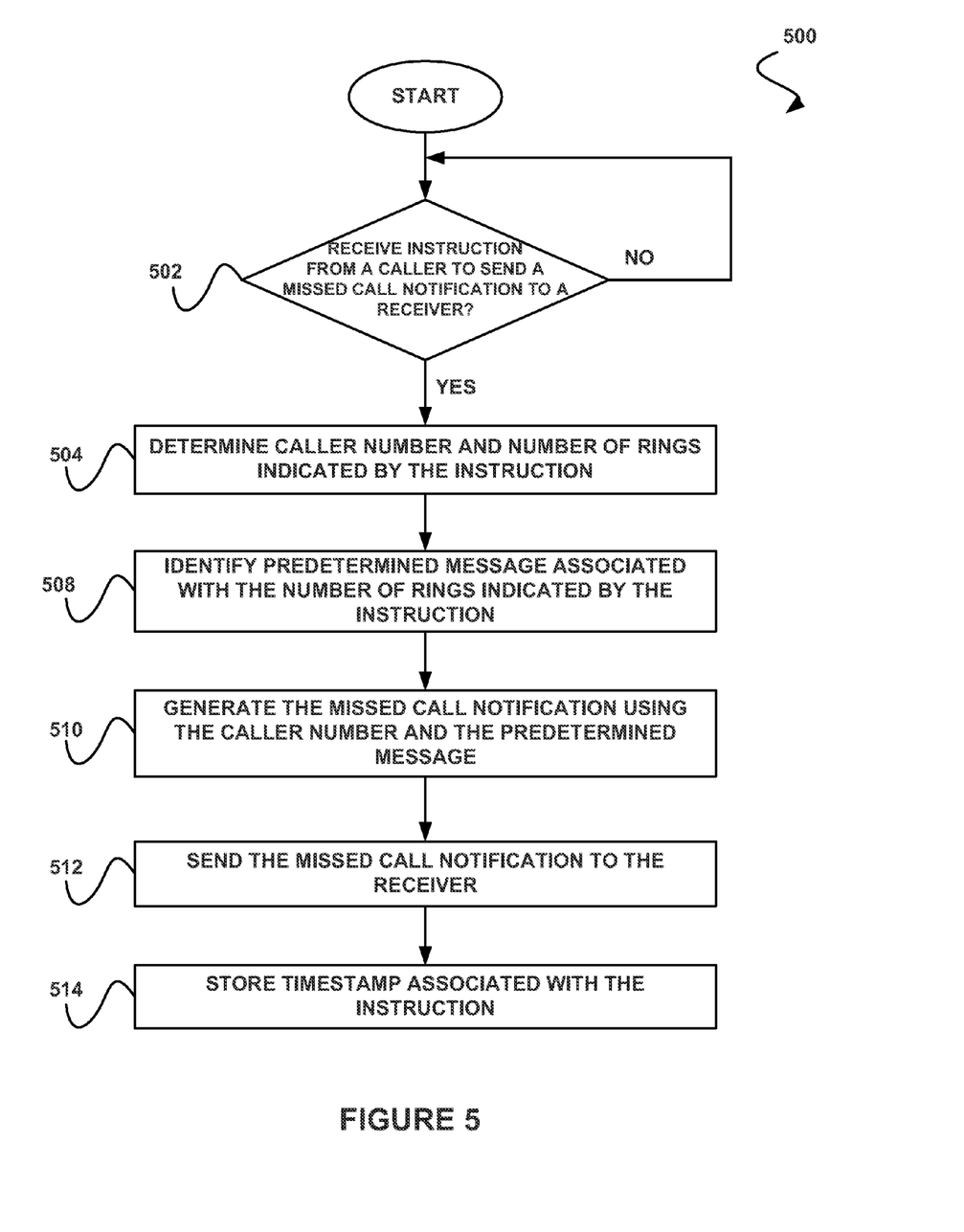
FIG. 5 illustrates a method for generating and sending a missed call notification to a receiver based on an instruction from a caller, in accordance with yet another embodiment.

FIG. 5 illustrates a method 500 for generating and sending a missed call notification to a receiver based on an instruction from a caller, in accordance with yet another embodiment. As an option, the method 500 may be carried out in the context of the details of FIGS. 1-4. For example, the method 500 may be carried out by the USSD server 404 of FIG. 4. Of course, however, the method 500 may be carried out in any desired environment. Yet again, the aforementioned definitions may equally apply to the description below.

As shown in decision 502, it is determined whether an instruction is received from a caller to send a missed call notification to a receiver. Such instruction may include an instruction generated without necessarily calling the receiver and disconnecting such call. If it is determined that such an instruction is not received, the method 500 terminates.

If, however, it is determined that an instruction to send a missed call notification to a receiver is received from a caller, a caller number and a number of rings indicated by the instruction are determined. Note operation 504. With respect to the present embodiment, the caller number may include a number of a calling device from which the missed call notification instruction was received (e.g. as indicated by the instruction received from the caller). In addition, the number of rings may include any particular number configured by the caller, as indicated by the instruction received from the caller.

Additionally, a predetermined message associated with the number of rings indicated by the instruction is identified, as shown in operation 506. For example, for each of a plurality of different numbers of rings, a different predefined message may be associated therewith (e.g. mapped thereto). Such associations may be provided utilizing a table, database, or any other data structure.

As shown in operation 508, the missed call notification is then generated using the caller number and the predetermined message. For example, the missed call notification may be generated to include the predefined message associated with the number of rings. As an option, it may include the number of rings as a part of the notification text. Further, the missed call notification may be generated to include text indicating the caller number.

Further, the missed call notification is sent to the receiver, as shown in operation 512. For example, the missed call notification may be sent via an SMS message, a USSD message, etc. Moreover, a timestamp associated with the instruction is stored, as shown in operation 514. As another option, the stored timestamp may be associated with the sending of the missed call notification. Optionally, the timestamp may be stored by requesting a rating engine (e.g. the rating engine 408 of FIG. 4 to store the timestamp).

Figure 6:
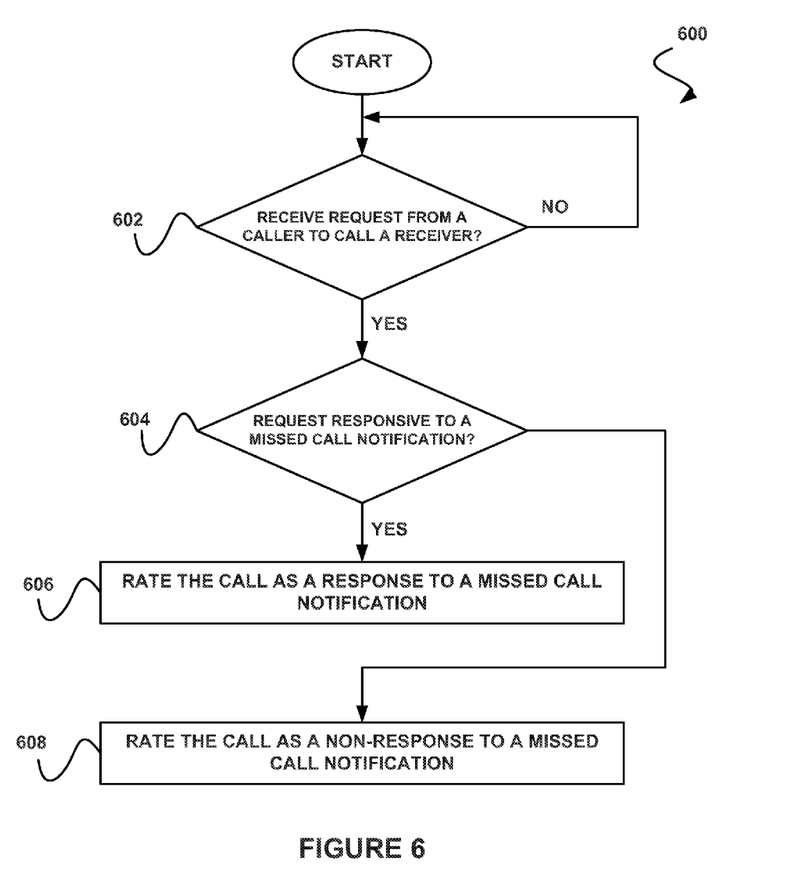
FIG. 6 illustrates a method for rating a call based on a determination of whether the call is responsive to a missed call notification, in accordance with still yet another embodiment.

FIG. 6 illustrates a method 600 for rating a call based on a determination of whether the call is responsive to a missed call notification, in accordance with still yet another embodiment. As an option, the method 600 may be carried out in the context of the details of FIGS. 1-5. For example, the method 600 may be carried out by the MSC CDR/SCP 412 of FIG. 4. Of course, however, the method 600 may be carried out in any desired environment. Again, the aforementioned definitions may equally apply to the description below.

As shown in decision 602, it is determined whether a request to call a receiver is received from a caller. Such request may include any initiation of a call by a caller to a receiver. If it is determined that such a request has not been received, the method 600 terminates.

If, however, it is determined that a request to call a receiver is received from a caller, it is further determined whether the request is responsive to a missed call notification. Note decision 604. In one embodiment, the call may be determined to be responsive to a missed call notification if the call was initiated using an interaction with a missed call notification (e.g. selection of an option included in the missed call notification, etc.). In another embodiment, the call may be determined to be responsive to a missed call notification if predetermined parameters (e.g. a caller number, a receiver number, etc.) of the call match parameters associated with a missed call notification, as stored in a list of missed call notifications sent between parties, an optionally if a timestamp of the call indicates a time within a predetermined period of time of a time indicated by a timestamp associated with the matching missed call notification. To this end, a request from a receiver of a missed call notification (i.e. caller in the embodiment of FIG. 6) to call a caller that sent the missed call notification (i.e. the receiver in the embodiment of FIG. 6) may be identified as a response to the missed call notification.

If it is determined that the call is responsive to a missed call notification, the call is rated as a response to a missed call notification. Note operation 606. For example, the call may be rated according to a policy associated with responses to missed call notifications. If it is determined that the call is not responsive to a missed call notification, the call is rated as a non-response (e.g. as non-responsive) to a missed call notification, as shown in operation 608. For example, the call may be rated according to a policy associated with non-responses to missed call notifications. In this way, the call may be rated based on an identification of the requested call as a response to the missed call notification.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, the computer program including instructions which, when executed by a processor, cause the processor to perform a method comprising:
   receiving an instruction from a caller to send a missed call notification to a receiver, without the caller calling the receiver;
   identifying at least one parameter associated with the instruction, wherein the at least one parameter includes a number of rings associated with the missed call notification;
   generating the missed call notification utilizing the at least one parameter; and
   sending the missed call notification to the receiver, such that the receiver receives the missed call notification without receiving a corresponding call from the caller.

2. The computer program of claim 1, wherein the computer program is operable such that the instruction is received in response to the caller selecting a predefined option on a calling device of the caller.

3. The computer program of claim 1, wherein the computer program is operable such that the instruction is received by way of a calling device of the caller sending the instruction to a predefined number separate from a receiving device utilized by the receiver for receiving the missed call notification.

4. The computer program of claim 1, wherein the missed call notification includes a notification that the receiver has missed a call from the caller.

5. The computer program of claim 1, wherein the at least one parameter includes a number of a receiving device utilized by the receiver for receiving the missed call notification.

6. The computer program of claim 1, wherein the at least one parameter includes a number of a calling device of the caller utilized for sending the instruction.

7. The computer program of claim 1, wherein the computer program is operable such that the number of rings is configured by the caller.

8. The computer program of claim 1, wherein the computer program is operable such that the at least one parameter associated with the instruction is identified by extracting the at least one parameter from the instruction.

9. The computer program of claim 1, wherein the computer program is operable such that the missed call notification is generated utilizing the at least one parameter by configuring text included in the missed call notification based on the at least one parameter.

10. The computer program of claim 9, wherein the at least one parameter includes a number of a calling device of the caller utilized for sending the instruction, and the computer program is operable such that the text included in the missed call notification is of the number of the calling device.

11. The computer program of claim 9, wherein the computer program is operable such that the text included in the missed call notification is of a predetermined message associated with the number of rings.

12. The computer program of claim 1, wherein the computer program is operable such that the missed call notification is further generated by incorporating an advertisement into the missed call notification.

13. The computer program of claim 12, wherein the computer program is operable such that the advertisement is selected based on the at least one parameter.

14. The computer program of claim 1, wherein the computer program is operable such that the missed call notification is interactive for allowing the receiver to initiate a call to the caller utilizing the missed call notification.

15. The computer program of claim 1, further comprising identifying a request from the receiver to call the caller as a response to the missed call notification.

16. The computer program of claim 15, further comprising rating the call from the receiver to the caller based on the identification of the request as the response to the missed call notification.

17. A method, comprising:
receiving an instruction from a caller to send a missed call notification to a receiver, without the caller calling the receiver;
identifying at least one parameter associated with the instruction, wherein the at least one parameter includes a number of rings associated with the missed call notification;
generating the missed call notification utilizing the at least one parameter, using a processor; and
sending the missed call notification to the receiver, such that the receiver receives the missed call notification without receiving a corresponding call from the caller.

18. A system, comprising:
a processor for:
receiving an instruction from a caller to send a missed call notification to a receiver, without the caller calling the receiver;
identifying at least one parameter associated with the instruction, wherein the at least one parameter includes a number of rings associated with the missed call notification;
generating the missed call notification utilizing the at least one parameter; and
sending the missed call notification to the receiver, such that the receiver receives the missed call notification without receiving a corresponding call from the caller.

19. The system of claim 18, wherein the processor is coupled to memory via a bus.

20. The computer program of claim 4, wherein the missed call notification includes a notification that the receiver has missed the corresponding call from the caller, where the corresponding call was not actually made by the caller to the receiver, such that the missed call notification is used as a substitute for the caller placing the corresponding call to the receiver.

21. The computer program of claim 1, further comprising sending an update request to a rating engine, where the update request includes a request for the rating engine to update a list of missed calls with the instruction for the missed call notification.

22. The computer program of claim 1, further comprising:
identifying a request from the receiver to call the caller;
determining that the request from the receiver to call the caller is in response to the missed call notification; and
discounting a rating of the call from the receiver to the caller in response to the determination that the request from the receiver to call the caller is in response to the missed call notification.

23. The computer program of claim 1, wherein the missed call notification sent to the receiver indicates that any subsequent call made to the caller as a response to the missed call notification and made within a first predetermined period of time from receipt of the missed call notification that lasts for a second predetermined period of time will be charged at a discounted rate.

24. The computer program of claim 22, wherein the at least one parameter associated with the instruction includes a timestamp indicating a time at which the instruction was received from the caller at an unstructured supplementary service data (USSR) server, wherein the USSD server sends an update request to a rating engine to store the instruction for use in rating the call from receiver to the caller.

25. The computer program of claim 1, wherein the at least one parameter is included in the instruction for extraction of the at least one parameter in response to receiving the instruction from the caller, and the at least one parameter further includes an identifier of the receiver and an identifier of the caller.

26. The computer program of claim 1, wherein the number of rings associated with the missed call notification is a simulated number of rings, selected by the caller, such that the missed call notification sent to the receiver is instructed for the number of rings without the caller calling the receiver and thereby without allowing the number of rings to occur.

* * * * *